(12) United States Patent
Andrews (10) Patent No.: US 12,372,119 B2
(45) Date of Patent: Jul. 29, 2025

(54) PRESS TOOL ASSEMBLIES, SYSTEMS, AND METHODS FOR INSERTING BUSHING ASSEMBLIES

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

(\*) Notice: Subject to any disclaimer, the term of this patent is extended or adjusted under 35 U.S.C. 154(b) by 0 days.

(21) Appl. No.: 18/642,359

(22) Filed: Apr. 22, 2024

(65) Prior Publication Data

US 2024/0376936 A1   Nov. 14, 2024

Related U.S. Application Data

(60) Provisional application No. 63/497,987, filed on Apr. 24, 2023.

(51) Int. Cl.
F16C 43/02  (2006.01)

(52) U.S. Cl.
CPC .......... *F16C 43/02* (2013.01); *F16C 2226/12* (2013.01)

(58) Field of Classification Search
CPC .............................. F16C 43/02; F16C 2226/12
See application file for complete search history.

(56) References Cited

U.S. PATENT DOCUMENTS

| | | | |
|---|---|---|---|
| 569,527 A | 10/1896 | Tilton | |
| 689,154 A | 12/1901 | Bartlett | |

(Continued)

FOREIGN PATENT DOCUMENTS

| | | | |
|---|---|---|---|
| AU | 2015200375 A1 | 8/2015 | |
| AU | 2015200630 A1 | 8/2015 | |

(Continued)

OTHER PUBLICATIONS

Amazon.com, [Anti-Spill Cup Holder], date first available May 1, 2020 [online], [site visited May 19, 2023], available from the internet URL; https://amazon.com/Anti-Spill-Holder-Coaster-Anti-Slip-Outdoors/dp/B08L8MWXJY (Year: 2020)

(Continued)

*Primary Examiner* — Jason L Vaughan
*Assistant Examiner* — Amanda Kreiling
(74) *Attorney, Agent, or Firm* — Michael R. Schacht; Schacht Law Office, Inc.

(57) ABSTRACT

A press tool system for pressing a bushing assembly into a bushing opening defined by a structural member comprising a tool assembly and an actuator system. The press tool system comprises a tool assembly and an actuator system. The tool assembly comprises a brace assembly, a drive member, and a retaining sleeve. The actuator system comprises an actuator housing assembly and a piston member. The brace assembly is arranged to brace the actuator housing assembly relative to the structural member. The drive member is arranged between the piston member and the bushing assembly. The retaining sleeve is arranged at least partly around the bushing assembly. The actuator system displaces the piston member relative to the actuator housing assembly to force the bushing assembly at least partly through the retaining sleeve and into the bushing opening in a desired position relative to the structural member.

19 Claims, 4 Drawing Sheets

(56) References Cited

U.S. PATENT DOCUMENTS

| | | | |
|---|---|---|---|
| 1,131,868 | A | 3/1915 | Ridlon |
| 1,155,720 | A | 10/1915 | Louis |
| 1,334,658 | A | 3/1920 | Koch |
| 1,368,760 | A | 2/1921 | Schilling |
| 1,429,567 | A | 9/1922 | Carlisle |
| 1,442,626 | A | 1/1923 | McGee |
| 1,476,983 | A | 12/1923 | King |
| 1,498,638 | A | 6/1924 | Periolat |
| 1,552,616 | A | 9/1925 | Jake |
| 1,650,964 | A | 11/1927 | Schmitt |
| 1,682,956 | A | 9/1928 | Dawson et al. |
| 1,778,802 | A | 10/1930 | Howell |
| 1,817,988 | A | 8/1931 | Emal |
| 1,849,805 | A | 3/1932 | Raymond |
| 1,857,211 | A | 5/1932 | Oldum et al. |
| 1,990,570 | A | 2/1935 | Smith |
| 1,996,967 | A | 4/1935 | Kratky |
| 2,036,782 | A | 4/1936 | Ullmo |
| 2,052,534 | A | 8/1936 | Quarles |
| 2,085,529 | A * | 6/1937 | Heimbach ............ B25B 27/026 29/888.061 |
| 2,290,427 | A | 7/1942 | Harrington |
| 2,366,467 | A | 1/1945 | Andrews |
| 2,374,861 | A | 5/1945 | Graham |
| 2,380,980 | A | 8/1945 | Looncy |
| 2,427,948 | A | 9/1947 | Cornwell |
| 2,484,129 | A | 10/1949 | Taylor |
| 2,549,429 | A | 4/1951 | Cowles |
| 2,681,501 | A | 6/1954 | Albert |
| 2,755,540 | A | 7/1956 | Crozier |
| 2,798,392 | A | 7/1957 | Randolph |
| 3,102,333 | A | 9/1963 | Thornton et al. |
| 3,110,958 | A | 11/1963 | McCord |
| 3,123,901 | A | 3/1964 | Traugott |
| 3,200,483 | A | 8/1965 | Menegoni |
| 3,237,291 | A | 3/1966 | Kelso |
| 3,327,377 | A | 6/1967 | German |
| 3,336,652 | A | 8/1967 | Andre |
| 3,662,449 | A | 5/1972 | Hashimoto |
| 3,742,570 | A | 7/1973 | Felser |
| 3,785,050 | A | 1/1974 | Whitledge |
| 3,862,483 | A | 1/1975 | Kloster |
| 3,964,149 | A | 6/1976 | Hugh |
| 4,034,458 | A | 7/1977 | Ford et al. |
| 4,195,398 | A | 4/1980 | Matthews |
| 4,363,475 | A | 12/1982 | McCarty |
| 4,398,706 | A | 8/1983 | Kaulfuss |
| 4,426,758 | A | 1/1984 | Castoe |
| 4,428,105 | A | 1/1984 | Abbott et al. |
| 4,476,750 | A | 10/1984 | Murphy |
| 4,589,180 | A | 5/1986 | Vachon |
| 4,619,027 | A | 10/1986 | Ohannesian |
| 4,624,039 | A | 11/1986 | Lawrence et al. |
| 4,648,166 | A | 3/1987 | Tilman |
| 4,649,615 | A | 3/1987 | Hundley |
| 4,672,731 | A | 6/1987 | Taylor |
| 4,691,424 | A | 9/1987 | Michael et al. |
| 4,765,057 | A | 8/1988 | Muller |
| 4,769,890 | A | 9/1988 | Maynard |
| 4,770,401 | A | 9/1988 | Donaldson |
| 4,771,528 | A | 9/1988 | Stromberg |
| 4,867,366 | A | 9/1989 | Kleinholz |
| 4,940,370 | A | 7/1990 | Gipson |
| 4,941,252 | A | 7/1990 | Haisch et al. |
| 4,976,280 | A | 12/1990 | Lagana |
| 4,977,660 | A | 12/1990 | Maynard |
| 4,989,312 | A | 2/1991 | Maddalena |
| 5,025,542 | A | 6/1991 | Jacks |
| 5,125,324 | A | 6/1992 | Araki et al. |
| 5,159,743 | A | 11/1992 | Somerville |
| 5,163,665 | A | 11/1992 | Klearman |
| 5,174,005 | A | 12/1992 | Somerville |
| 5,181,303 | A | 1/1993 | Gregg |
| 5,210,919 | A | 5/1993 | Garman |
| 5,211,211 | A | 5/1993 | Rubino et al. |
| 5,224,254 | A | 7/1993 | McPeak et al. |
| 5,233,741 | A | 8/1993 | Maynard |
| 5,255,435 | A | 10/1993 | Shultz |
| 5,257,445 | A | 11/1993 | Mayberry |
| 5,271,136 | A | 12/1993 | Skoworodko |
| 5,341,553 | A | 8/1994 | Herzhauser |
| 5,350,183 | A | 9/1994 | Shealy |
| 5,355,574 | A | 10/1994 | Zweekly et al. |
| 5,373,636 | A | 12/1994 | Martinie |
| 5,419,027 | A | 5/1995 | McPeak et al. |
| 5,519,929 | A | 5/1996 | Bleckman |
| 5,535,973 | A | 7/1996 | Bailey et al. |
| 5,557,833 | A | 9/1996 | Pool |
| 5,586,378 | A | 12/1996 | Smith |
| 5,606,788 | A | 3/1997 | Rubino et al. |
| 5,692,437 | A | 12/1997 | Tabain |
| 5,787,561 | A | 8/1998 | Harmand |
| 5,839,180 | A | 11/1998 | Hochmiller |
| RE36,009 | E | 12/1998 | Shultz |
| 5,857,252 | A | 1/1999 | Jansen |
| 5,887,328 | A | 3/1999 | Rydin et al. |
| 5,893,202 | A | 4/1999 | Graham et al. |
| 5,898,985 | A | 5/1999 | Villarreal |
| 5,983,474 | A | 11/1999 | Koppe |
| 6,092,279 | A | 7/2000 | Shoup |
| 6,158,110 | A | 12/2000 | Takacs |
| 6,192,566 | B1 | 2/2001 | Dunum |
| 6,431,534 | B1 | 8/2002 | Orosz et al. |
| 6,505,390 | B2 | 1/2003 | Emanuel |
| 6,574,843 | B1 | 6/2003 | Meadows |
| 6,601,277 | B1 | 8/2003 | Swanson |
| 6,618,920 | B1 | 9/2003 | Emanuel |
| 6,716,218 | B2 | 4/2004 | Holmes et al. |
| 6,789,791 | B2 | 9/2004 | Genduso |
| 7,003,877 | B2 | 2/2006 | Reale |
| 7,020,944 | B2 | 4/2006 | Klann |
| 7,093,809 | B2 | 8/2006 | Hwang |
| 7,117,573 | B1 | 10/2006 | Hu |
| 7,213,317 | B2 | 5/2007 | Hu |
| 7,219,885 | B2 | 5/2007 | Nardozza |
| 7,387,296 | B2 | 6/2008 | Alberti |
| 7,475,465 | B1 | 1/2009 | Weiss |
| 7,520,041 | B1 | 4/2009 | Aguilar |
| 7,669,305 | B1 | 3/2010 | Lionberg |
| 7,669,306 | B2 | 3/2010 | Palka |
| 7,685,688 | B2 | 3/2010 | Fan |
| 7,707,709 | B2 | 5/2010 | Whitehead |
| 7,717,573 | B2 | 5/2010 | Matsubara et al. |
| 7,818,860 | B2 | 10/2010 | Hume et al. |
| 7,890,305 | B2 | 2/2011 | Lionberg |
| 7,891,084 | B1 | 2/2011 | Sollami |
| 7,895,723 | B2 | 3/2011 | Wridt et al. |
| 7,918,003 | B2 | 4/2011 | Acciardo, Jr. |
| 7,996,972 | B2 | 8/2011 | Hu |
| 8,079,123 | B2 | 12/2011 | Lin |
| 8,205,529 | B1 | 6/2012 | Laurie |
| 8,256,081 | B2 | 9/2012 | Fridman |
| 8,387,252 | B1 | 3/2013 | Johnson et al. |
| 8,567,292 | B1 | 10/2013 | Park et al. |
| 8,627,557 | B2 | 1/2014 | Jansen et al. |
| 8,689,420 | B2 | 4/2014 | Barrios et al. |
| 8,745,832 | B2 | 6/2014 | Barrios et al. |
| 9,107,719 | B2 | 8/2015 | Gauthier |
| 9,511,488 | B2 | 12/2016 | Andrews et al. |
| 9,651,093 | B2 | 5/2017 | Robb, Jr. |
| 9,701,179 | B2 | 7/2017 | Bernardo |
| 9,718,177 | B1 | 8/2017 | Bell |
| 9,751,199 | B2 | 9/2017 | Andrews |
| 9,808,922 | B2 | 11/2017 | Breschi et al. |
| 9,908,208 | B2 | 3/2018 | Andrews et al. |
| 9,981,368 | B2 | 5/2018 | Zeren et al. |
| 10,005,175 | B2 | 6/2018 | Morris |
| 10,179,397 | B1 | 1/2019 | Hunter |
| 10,265,839 | B1 | 4/2019 | Hunter |
| 10,307,901 | B2 | 6/2019 | Andrews et al. |
| 10,486,293 | B2 | 11/2019 | Verkley |
| 10,583,546 | B2 | 3/2020 | Yang |
| 10,668,604 | B2 | 6/2020 | Caywood et al. |
| 10,744,627 | B2 | 8/2020 | Andrews |

(56) References Cited

U.S. PATENT DOCUMENTS

| | | |
|---|---|---|
| 10,906,140 B2 | 2/2021 | Andrews et al. |
| 10,987,788 B2 | 4/2021 | Andrews |
| 11,090,788 B2 | 8/2021 | Huang |
| 11,135,711 B2 | 10/2021 | Andrews |
| 11,285,583 B2 | 3/2022 | Stuart et al. |
| 11,370,093 B2 | 6/2022 | Kochie et al. |
| 11,815,132 B2 | 11/2023 | Andrews |
| 11,926,025 B2 | 3/2024 | Andrews |
| 11,999,034 B2 | 6/2024 | Andrews |
| 12,138,759 B2 | 11/2024 | Andrews |
| 2001/0029655 A1 | 10/2001 | Emanuel |
| 2002/0095759 A1 | 7/2002 | Scott |
| 2003/0033909 A1 | 2/2003 | Gore |
| 2003/0084555 A1 | 5/2003 | Meggiolan |
| 2003/0106197 A1 | 6/2003 | Emanuel |
| 2005/0071973 A1 | 4/2005 | Emanuel |
| 2006/0037184 A1 | 2/2006 | Miller |
| 2006/0070221 A1 | 4/2006 | Wridt et al. |
| 2006/0075617 A1 | 4/2006 | Toosky et al. |
| 2006/0112530 A1 | 6/2006 | Rubino et al. |
| 2006/0162509 A1 | 7/2006 | Wang |
| 2007/0251076 A1 | 11/2007 | Zhong et al. |
| 2008/0048375 A1 | 2/2008 | Rolfe et al. |
| 2008/0235930 A1 | 10/2008 | English |
| 2008/0289841 A1 | 11/2008 | Kang |
| 2009/0025514 A1 | 1/2009 | Barrios et al. |
| 2009/0211094 A1 | 8/2009 | Adelman |
| 2010/0000749 A1 | 1/2010 | Andel |
| 2010/0015834 A1 | 1/2010 | Siebens |
| 2010/0236039 A1 | 9/2010 | Robledo |
| 2010/0251528 A1 | 10/2010 | Hu |
| 2010/0281665 A1 | 11/2010 | Punaro |
| 2010/0283193 A1 | 11/2010 | Huang |
| 2011/0048649 A1 | 3/2011 | Komatsu et al. |
| 2011/0094076 A1 | 4/2011 | Liu |
| 2011/0219617 A1 | 9/2011 | Barrios et al. |
| 2012/0110815 A1 | 5/2012 | Brown |
| 2012/0272499 A1 | 11/2012 | Schley et al. |
| 2013/0026692 A1 | 1/2013 | Prins |
| 2013/0074306 A1 | 3/2013 | Muenchrath et al. |
| 2013/0133175 A1 | 5/2013 | Doan et al. |
| 2014/0338166 A1 | 11/2014 | Studney |
| 2014/0345104 A1 | 11/2014 | Andrews et al. |
| 2014/0366954 A1 | 12/2014 | Miller et al. |
| 2015/0183102 A1 | 7/2015 | Breschi et al. |
| 2015/0183268 A1 | 7/2015 | Baldassara et al. |
| 2015/0209918 A1 | 7/2015 | Andrews |
| 2015/0224635 A1 | 8/2015 | Andrews |
| 2015/0290785 A1 | 10/2015 | Zimmer et al. |
| 2017/0100825 A1 | 4/2017 | Zeren et al. |
| 2017/0209994 A1 | 7/2017 | Hargrove et al. |
| 2017/0297152 A1 | 10/2017 | Andrews |
| 2017/0307020 A1 | 10/2017 | Andrews |
| 2017/0361438 A1 | 12/2017 | Andrews |
| 2018/0207776 A1 | 7/2018 | Andrews |
| 2018/0363693 A1 | 12/2018 | Yokomatsu |
| 2018/0370002 A1 | 12/2018 | Andrews |
| 2019/0070716 A1 | 3/2019 | Andrews |
| 2020/0039041 A1 | 2/2020 | Huang |
| 2021/0285499 A1 | 9/2021 | Andrews |
| 2021/0387316 A1 | 12/2021 | Andrews |
| 2022/0063071 A1 | 3/2022 | Andrews |
| 2023/0138801 A1 | 5/2023 | Andrews |
| 2023/0142403 A1 | 5/2023 | Andrews |
| 2023/0228298 A1 | 7/2023 | Andrews |
| 2024/0084855 A1 | 3/2024 | Andrews |
| 2024/0227140 A1 | 7/2024 | Andrews |
| 2024/0227141 A1 | 7/2024 | Klossok |
| 2024/0316735 A1 | 9/2024 | Andrews |
| 2024/0342884 A1 | 10/2024 | Andrews |
| 2024/0376936 A1 | 11/2024 | Andrews |
| 2024/0416492 A1 | 12/2024 | Andrews |
| 2025/0060007 A1 | 2/2025 | Andrews |
| 2025/0065478 A1 | 2/2025 | Andrews |

FOREIGN PATENT DOCUMENTS

| | | |
|---|---|---|
| AU | 2015334596 A1 | 5/2017 |
| AU | 2015335682 A1 | 5/2017 |
| AU | 2017225956 A1 | 8/2018 |
| AU | 2017248765 A1 | 9/2018 |
| AU | 2015200375 B2 | 7/2019 |
| AU | 2017248765 B2 | 11/2021 |
| AU | 2021234318 A1 | 10/2022 |
| AU | 2022201899 A1 | 10/2022 |
| AU | 2023205074 A1 | 7/2024 |
| AU | 2024202656 A1 | 11/2024 |
| AU | 202417089 | 12/2024 |
| AU | 202417562 | 12/2024 |
| AU | 202510470 | 2/2025 |
| AU | 202510473 | 2/2025 |
| AU | 2024205751 A1 | 3/2025 |
| CA | 234055 A | 9/1923 |
| CA | 234525 A | 9/1923 |
| CA | 236911 A | 1/1924 |
| CA | 236912 A | 1/1924 |
| CA | 236913 A | 1/1924 |
| CA | 2037021 A1 | 8/1995 |
| CA | 2852069 A1 | 11/2014 |
| CA | 2880139 A1 | 7/2015 |
| CA | 2881390 A1 | 8/2015 |
| CA | 2890557 A1 | 10/2015 |
| CA | 2965264 A1 | 4/2016 |
| CA | 2965324 A1 | 4/2016 |
| CA | 3015834 A1 | 9/2017 |
| CA | 3015852 A1 | 10/2017 |
| CA | 2852069 C | 1/2019 |
| CA | 2881390 C | 4/2019 |
| CA | 3037021 A1 | 9/2019 |
| CA | 3015834 C | 5/2021 |
| CA | 3176714 A1 | 9/2021 |
| CA | 3187064 A1 | 12/2021 |
| CA | 3128996 A1 | 2/2022 |
| CN | 106414122 A | 2/2017 |
| DE | 1741595 | 3/1957 |
| DE | 19631524 C1 | 11/1997 |
| DE | 20113561 U1 | 11/2001 |
| DE | 10221280 C1 | 8/2003 |
| DE | 20311755 U | 10/2003 |
| DE | 202006000788 U1 | 5/2006 |
| EP | 0988937 A2 | 3/2000 |
| EP | 2461061 A2 | 6/2012 |
| EP | 3423238 A1 | 1/2019 |
| EP | 3442751 A1 | 2/2019 |
| EP | 3678820 A | 7/2020 |
| EP | 3678820 A1 | 7/2020 |
| EP | 4454817 A1 | 10/2024 |
| EP | 4537983 | 4/2025 |
| FR | 2387090 A1 | 11/1978 |
| FR | 2670703 A1 | 6/1992 |
| JP | 104800 | 9/1974 |
| JP | S49104800 U | 10/1974 |
| JP | S57116178 A | 7/1982 |
| JP | S6219877 U | 8/1987 |
| JP | 192877 | 12/1987 |
| JP | H0192877 A | 4/1989 |
| JP | H04105881 A | 4/1992 |
| JP | H104800 A | 1/1998 |
| JP | 3104800 | 10/2004 |
| JP | 4105881 B2 | 6/2008 |
| JP | 3160459 U | 6/2010 |
| JP | 3192877 | 9/2014 |
| KR | 100746562 B1 | 8/2007 |
| KR | 101746033 B1 | 6/2017 |
| MX | 2022003342 A | 9/2022 |
| RU | 2028933 C1 | 2/1995 |
| SU | 654401 A2 | 3/1979 |
| SU | 1207744 A1 | 1/1986 |
| SU | 1384368 A1 | 3/1988 |
| SU | 1505740 A1 | 9/1989 |
| SU | 1632766 A1 | 3/1991 |
| TW | 306377 U | 5/1997 |
| TW | 471371 U | 1/2002 |
| TW | M342918 U | 10/2008 |

(56) References Cited

FOREIGN PATENT DOCUMENTS

| TW | M497081 U | 3/2015 |
|---|---|---|
| WO | 2011012552 A1 | 2/2011 |
| WO | 2016063140 A2 | 4/2016 |
| WO | 2016065311 A1 | 4/2016 |
| WO | 2016063140 A3 | 6/2016 |
| WO | 2017151953 A1 | 9/2017 |
| WO | 2017181078 A1 | 10/2017 |
| WO | 2019050989 A1 | 3/2019 |
| WO | 2021183800 A1 | 9/2021 |
| WO | 2021257477 A1 | 12/2021 |
| WO | 2023133401 A1 | 7/2023 |

OTHER PUBLICATIONS

Canadian Intellectual Property Office, "Office Action, Application No. 2,880,139, P218358CA", Jan. 7, 2019, 3 pages.
European Registration Serial No. 001348411-0001; Beverage Holders; Inventor Thomas J. Shaw; Registered Oct. 23, 2012; Published Apr. 9, 2013; 3 pages.
Greenerd, "Arbor Press History," Website http://www.greenerd.com/about-greenerd/history/default.aspxp. 2, predates Mar. 13, 2020, 5 pages.
International Searching Authority, International Search Report and Written Opinion, PCT/IB2015/002481, May 10, 2016, 6 pages.
International Searching Authority, International Search Report, Apr. 25, 2023, 2 pages.
International Searching Authority, ISR & Written Opinion, PCT/CA2024/050014, Mar. 27, 2024, 10 pages.
International Searching Authority, ISR & Written Opinion, PCT/US2015/057201, P218464pct, Dec. 22, 2015, 9 pages.
International Searching Authority, ISR & Written Opinion, PCT/US2017/020496, P219010pct, Jun. 1, 2017, 7 pages.
International Searching Authority, ISR & Written Opinion, PCT/US2017/027724, P219176pct, Aug. 17, 2017, 7 pages.
International Searching Authority, ISR & Written Opinion, PCT/US2018/049608, P219495pct, Dec. 6, 2018, 8 pages.
International Searching Authority, ISR & Written Opinion, PCT/US2021/021963, P220070pct, Jun. 3, 2021, 7 pages.
International Searching Authority, ISR & Written Opinion, PCT/US2021/037271, Jun. 15, 2020, 6 pages.
International Searching Authority, Written Opinion of the International Searching Authority, Apr. 25, 2023, 7 pages.
OTC, "Wheel Stud Remover/Installer," Product Brochure, 2009, 1 page, Product No. 5195.
OTC, "Wheel Stud Service Kit," Product Brochure, 2012, 1 page, Product No. 4295.
Registration Serial No. 302647759; Country China; Feeding Bottle Protective Sleeve; Inventor-Du Yaodong; Granted Nov. 20, 2013; 3 pages.
Semenov V. M., "Non-standard tool for dismantling and assembly work", Moskva, Izdatelstvo Kolos, (19750000), pp. 200-201, 219, 220, 253, 254, 257.
Toyota, "4Runner Repair Manual, Inspection and Repair of Front Axle Hub" 1990, pp. 1 and SA-18, vol. 2Publication No. RM143U2.
Wikipedia, "Hydraulic Press," Website http://en.wikipedia.org/wiki/Hydraulic-pressp., predates Mar. 13, 2020, 1.

\* cited by examiner

PRESS TOOL ASSEMBLIES, SYSTEMS, AND METHODS FOR INSERTING BUSHING ASSEMBLIES

RELATED APPLICATIONS

This application Ser. No. 18/642,359 claims benefit of U.S. Provisional Application Ser. No. 63/497,987 filed Apr. 24, 2023, the contents of which are incorporated herein by reference.

TECHNICAL FIELD

The present invention relates to press tools for inserting bushing assemblies and, more particularly, to press tools for inserting bushing assemblies having non-metal bushing housings.

BACKGROUND

Bushings form an energy absorbing interface between two metal objects. The bushing is typically made of a flexible material such as rubber, synthetic rubber, polyurethane, or the like. A typical bushing takes the form of a bushing assembly comprising a bushing housing and a bushing member arranged within the bushing housing.

As one example, in a vehicle suspension system, bushing assemblies are often used to attach a leaf spring to the chassis of the vehicle. The leaf spring defines a bushing opening, and the bushing assembly is driven or pressed in to the bushing opening using a press tool. The present invention is of particular relevance when used to assemble a bushing into an opening in a leaf spring, and that application of the present invention will be described herein. However, the press tool of the present invention may be used to insert bushings in other operating environments.

When the bushing housing is made of metal, the bushing assembly can be driven into the opening in the part that supports the bushing by applying a driving or pressing force to the bushing housing, which in turn carries the bushing member into the opening. However, a class of bushing assemblies employs a non-metal bushing housing. The use of a press to drive or press a non-metal bushing housing can result in a cracked or deformed bushing housing that may comprise the functionality of the bushing assembly. Special factory press systems and methods are used at the factory to install bushing assemblies having non-metal bushing housings. However, the use of such special press systems and methods is not feasible in a non-factory repair or maintenance shop environment.

The need thus exists for improved press tool assemblies, systems, and methods that can be used in repair or maintenance shop environments.

SUMMARY

The present invention may be embodied as a press tool system for pressing a bushing assembly into a bushing opening defined by a structural member comprising a tool assembly and an actuator system. The press tool system comprises a tool assembly and an actuator system. The tool assembly comprises a brace assembly, a drive member, and a retaining sleeve. The actuator system comprises an actuator housing assembly and a piston member. The brace assembly is arranged to brace the actuator housing assembly relative to the structural member. The drive member is arranged between the piston member and the bushing assembly. The retaining sleeve is arranged at least partly around the bushing assembly. The actuator system displaces the piston member relative to the actuator housing assembly to force the bushing assembly at least partly through the retaining sleeve and into the bushing opening in a desired position relative to the structural member.

The present invention may also be embodied as a method of pressing a bushing assembly into a bushing opening defined by a structural member, the method comprising the following steps. A tool assembly comprising a brace assembly, a drive member, and a retaining sleeve is provided. An actuator system comprising an actuator housing assembly and a piston member is provided. The brace assembly is arranged to brace the actuator housing assembly relative to the structural member. The drive member is arranged between the piston member and the bushing assembly. The retaining sleeve is arranged at least partly around the bushing assembly. The actuator system is operated to displace the piston member relative to the actuator housing assembly to force the bushing assembly at least partly through the retaining sleeve and into the bushing opening in a desired position relative to the structural member.

The present invention may also be embodied as a press tool system for pressing a bushing assembly into a bushing opening defined by a structural member. The press tool system comprises a tool assembly and an actuator system. The tool assembly comprises a brace assembly, a drive member, and a retaining sleeve. The actuator system comprises an actuator housing assembly and a piston member. The brace assembly is arranged to brace the actuator housing assembly relative to the structural member. The drive member is arranged between the piston member and the bushing assembly. The retaining sleeve is arranged at least partly around the bushing assembly. The retaining sleeve is arranged and configured to engage the structural member as the bushing assembly is forced into the bushing opening. The actuator system displaces the piston member relative to the actuator housing assembly to force the bushing assembly at least partly through the retaining sleeve and into the bushing opening in a desired position relative to the structural member.

DETAILED DESCRIPTION

Figure 1:
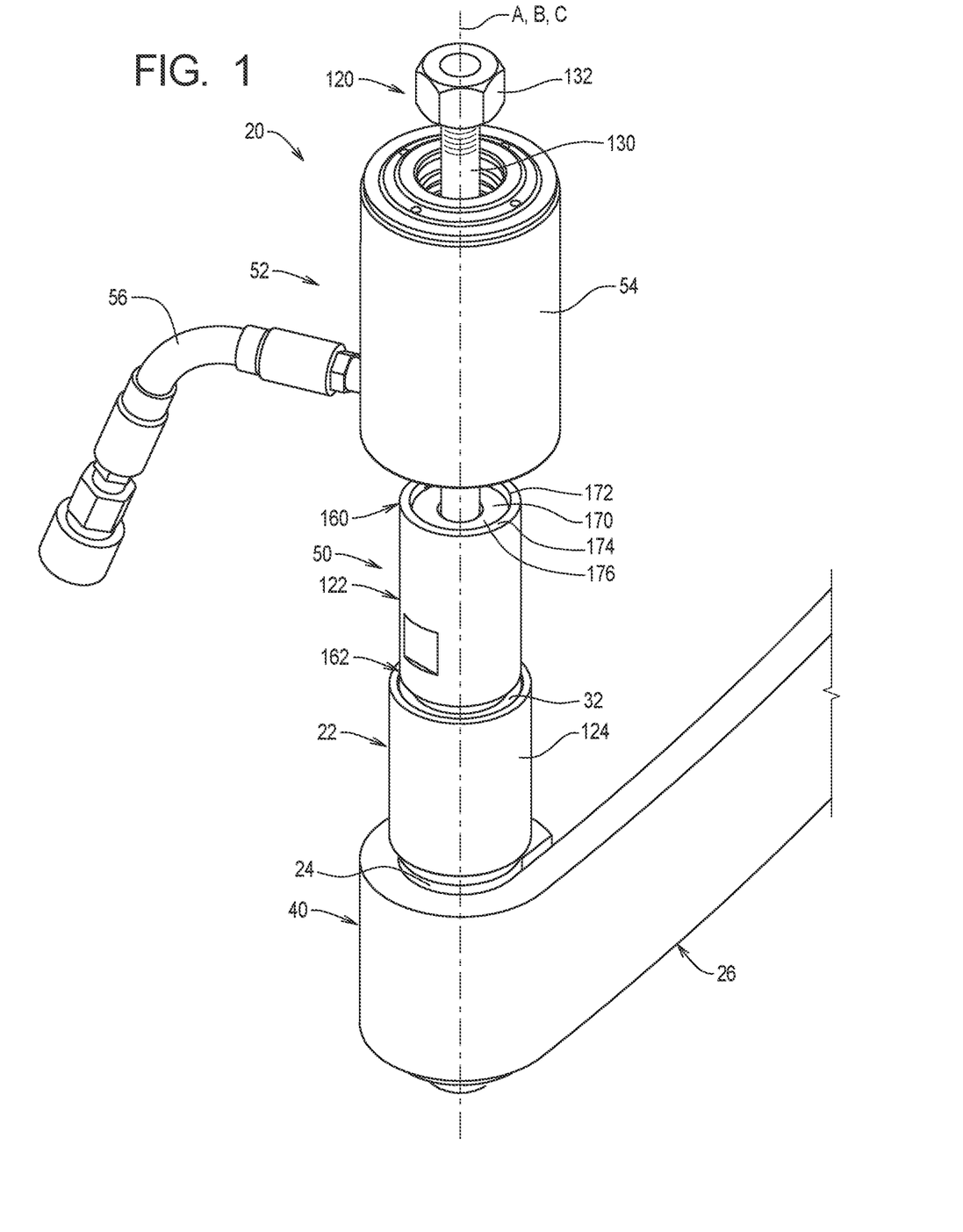
FIG. 1 is a perspective view illustrating the use of a first example press tool assembly and system of the present invention to insert a bushing assembly into a bushing opening in a leaf spring.

Referring initially to FIG. 1 of the drawing, depicted therein is a press tool system 20 configured to press a bushing assembly 22 into a bushing opening 24 formed in a structural member 26. The example structural member 26 is a leaf spring, but the present invention can be used with any structural member defining a bushing opening. The example bushing assembly 22 comprises a bushing member 30 coaxially mounted within a bushing housing 32. As is conventional, the example bushing member 30 defines a bushing passageway 34. The example structural member 26 defines a bushing support portion 40 defining the bushing opening 24. The example bushing assembly 22 and structural member 26 are or may be conventional and will be described herein only to that extent necessary for a complete understanding of the present invention.

The example press tool system 20 comprises a tool assembly 50 and an actuator system 52 comprising an actuator assembly 54 and a fluid supply line 56 connected to a fluid source (not shown). The example actuator assembly 54 comprises an actuator housing assembly 60 and a piston member 62. An actuator passageway 64 extends through the actuator housing assembly 60 and the piston member 62. Introduction of pressurized fluid from the fluid source through the fluid supply line 56 and into the actuator housing assembly 60 causes displacement of the piston member 62 relative to the actuator housing assembly 60.

The example tool assembly 50 comprises a brace assembly 120, a drive member 122, and a retaining sleeve 124. The drive member 122 is arranged to engage the piston member 62, the bushing assembly 22 is arranged within the retaining sleeve, and the retaining sleeve 124 is arranged between the drive member 122 and the bushing support portion 40. Operation of the actuator system 52 applies a drive or press force on the bushing assembly 22 through the drive member 122 and the retaining sleeve 124 such that the bushing assembly 22 is driven into the bushing opening 24.

Figure 2:
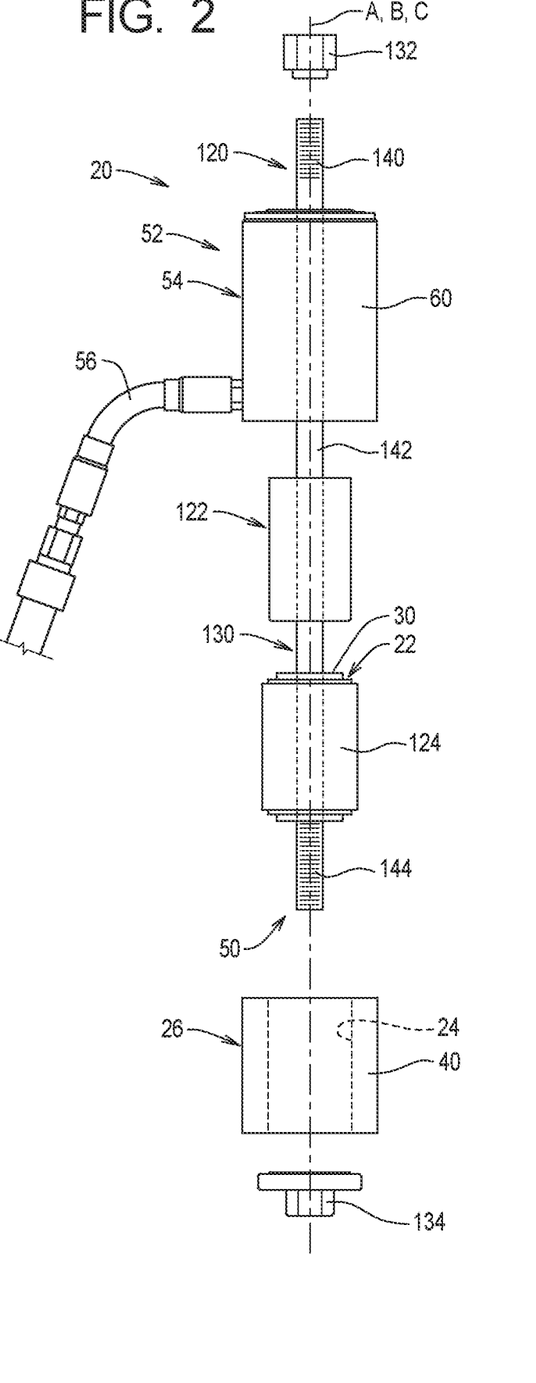
FIG. 2 is a side elevation exploded view of the first example press tool assembly and system, the bushing assembly to be inserted therewith, and a portion of the leaf spring defining the bushing opening.

The example brace assembly 120 comprises a brace rod 130, a brace nut 132, and an anchor nut 134. The example brace rod 130 defines a first threaded portion 140, a shaft portion 142, and a second threaded portion 144. The example anchor nut 134 defines a main portion 150, a flange portion 152, and an anchor passageway 154 defining a threaded portion 156 and a bushing portion 158.

The example drive member 122 defines an actuator end 160 and a drive end 162. The example actuator end 160 defines a piston engaging surface 170, and a spacing projection 172 extends from the example piston engaging surface 170 to define a housing engaging surface 174 and a piston cavity 176. The example drive end 162 defines a drive engaging surface 180, a drive projection 182. The drive engaging surface 180 and the drive projection 182 define a drive cavity 184.

The example retaining sleeve 124 defines a first end 190, a second end 192, and a drive interior surface 194 defining a sleeve passageway 196.

The example press tool system 20 defines a press axis A, the example bushing assembly 22 defines a bushing axis B, and the example bushing opening 24 defines a structural axis C. With the press axis A, the bushing axis B, and the structural axis C substantially aligned as shown in FIG. 2, at least a portion of the example brace rod 130 is passed through the actuator passageway 64, the drive cavity 164, the sleeve passageway 196, the bushing passageway 34, and the anchor passageway 154.

Figure 3:
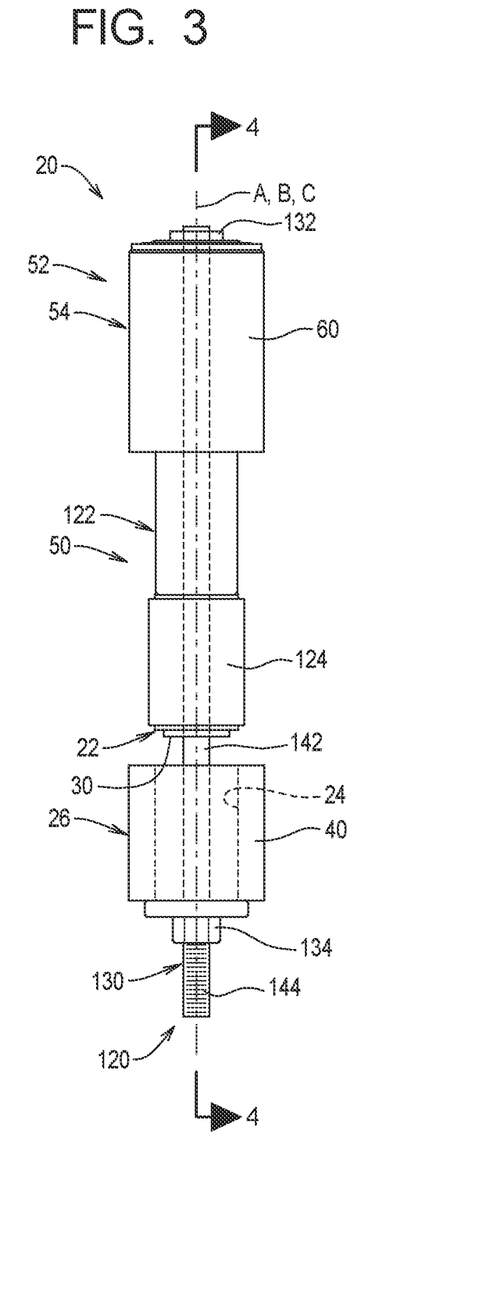
FIG. 3 is a side elevation view of the example first example press tool assembly and system, the bushing assembly to be inserted therewith, and a portion of the leaf spring defining the bushing opening.
Figure 4:
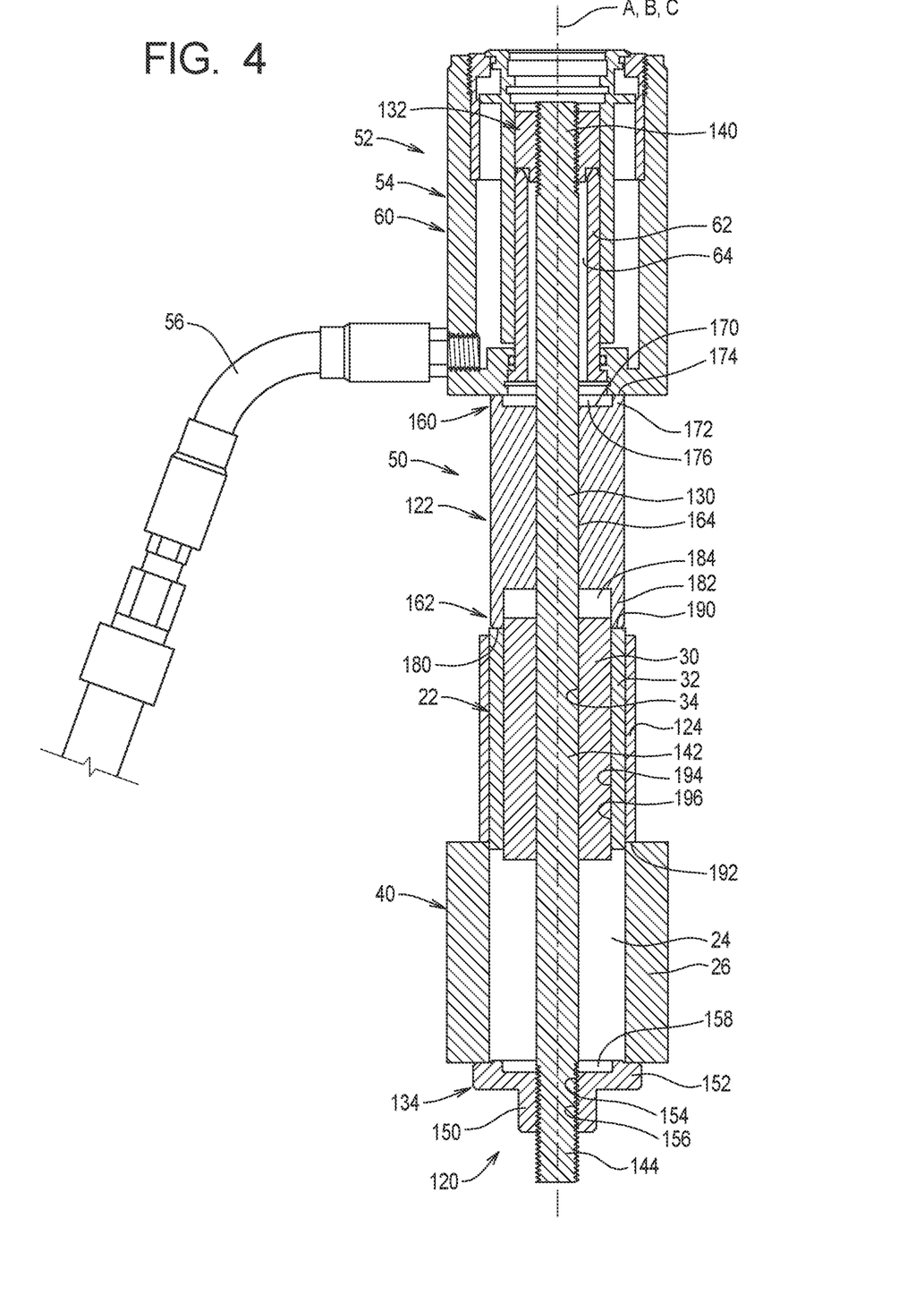
FIG. 4 is a side elevation partial section view of the example first example press tool assembly and system, the bushing assembly to be inserted therewith, and a portion of the leaf spring defining the bushing opening.

The brace nut 132 is secured to the first threaded portion 140 of the brace rod 130, and the anchor nut 134 is secured to the second threaded portion 144 of the brace rod 130. With the piston member 62 in a retracted position, the brace nut 132 and the anchor nut 134 are tightened such that the brace nut 132 engages the actuator housing assembly 60 and the flange portion 152 of the anchor nut 134 engages the structural member 26. As shown in FIGS. 3 and 4, the press axis A, the bushing axis B, and the structural axis C are all substantially aligned, and a distance between the brace nut 132 and the anchor nut 134 is substantially fixed.

Figure 5:
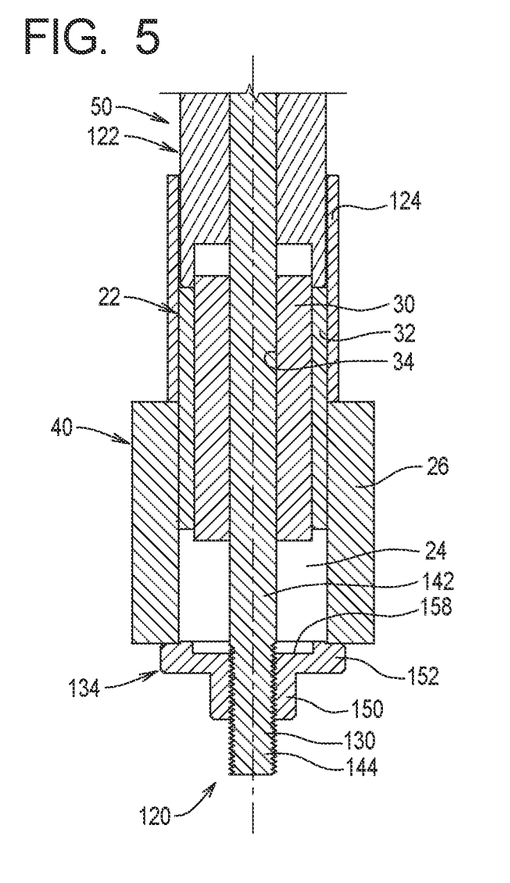
FIGS. 5 and 6 are side elevation section views depicting use the example first example press tool assembly and system to insert the bushing assembly in to the bushing opening.
Figure 6:
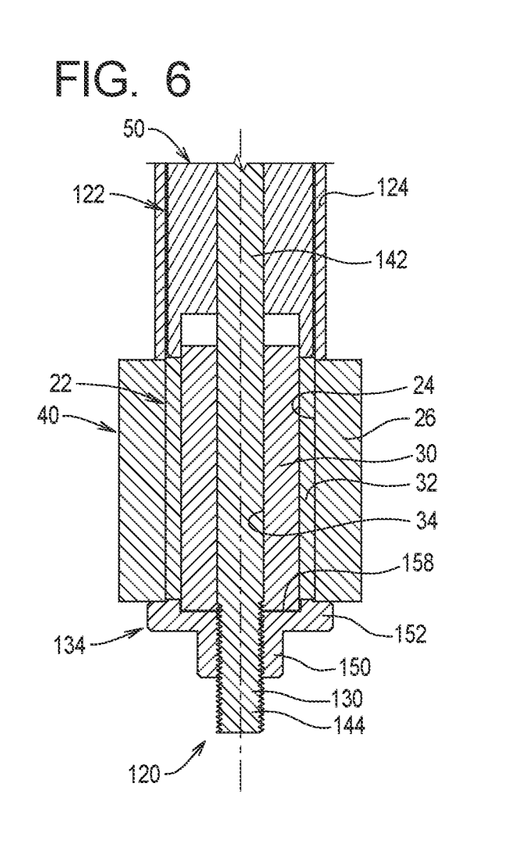

Operation of the actuator system 52 displaces the piston member 62 relative to the actuator housing assembly 54 towards the structural member 26. Displacement of the piston member 62 displaces the drive member 122 towards the retaining sleeve 124 towards the structural member 26. Displacement of the drive member 122 displaces the bushing assembly 22 into the bushing opening 24.

During driving of the bushing assembly 22 into the bushing opening 24, the piston member 62 engages the piston engaging surface 170 of the drive member 122, the drive engaging surface 180 engages bushing housing 32, and the bushing housing 32 is completely surrounded by the retaining sleeve 124. The tolerances between the sleeve passageway 196 and an exterior surface of the bushing housing 32 are such that the bushing assembly 22 to be displaced through the retaining sleeve 124 but deformation or cracking of the bushing housing 32 during driving of the bushing assembly 22 is substantially prevented.

The actuator system 52 is operated until at least a portion of the bushing assembly 22 is within the bushing portion 158 of the anchor passageway 154. The example anchor bushing portion 158 is configured such that, when at least a portion of the bushing assembly 22 engages the anchor nut 134, the bushing assembly 22 is in a desired position relative to the structural member 26.

Figure 7:
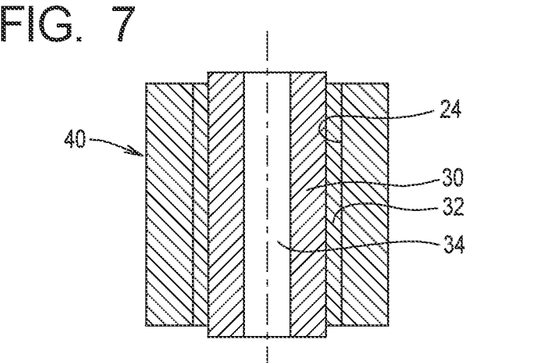
FIG. 7 is a side elevation section view illustrating the bushing assembly as installed in the bushing opening in the leaf spring.

Disconnecting the source of pressurized fluid from the actuator system 52 and releasing pressurized fluid from the actuator assembly 54 removes the driving of pressing force from the bushing assembly 22. When the pressurized fluid is released, the brace and/or anchor nuts 132 and 134 may be removed from the brace rod 130 as shown in FIG. 7 allows the example tool assembly 50 to be disassembled and removed from the bushing assembly 22, leaving the bushing assembly 22 securely supported within the bushing opening 24 defined by the structural member 26.

What is claimed is:

1. A press tool system for pressing a bushing assembly into a bushing opening defined by a structural member, the press tool system comprising:
   a tool assembly comprising a brace assembly, a drive member, and a retaining sleeve; and
   an actuator system comprising an actuator housing assembly and a piston member; wherein
   the brace assembly is arranged to brace the actuator housing assembly relative to the structural member;
   the drive member is arranged between the piston member and the bushing assembly;
   the retaining sleeve is arranged at least partly around the bushing assembly; and
   the actuator system displaces the piston member relative to the actuator housing assembly to force the bushing assembly at least partly through the retaining sleeve and into the bushing opening in a desired position relative to the structural member.

2. The press tool system as recited in claim 1, in which the retaining sleeve is arranged and configured to engage the structural member as the bushing assembly is forced into the bushing opening.

3. The press tool system as recited in claim 1, in which the bushing assembly moves relative to the retaining sleeve as the bushing assembly is forced into the bushing opening.

4. The press tool system as recited in claim 1, in which the drive member is arranged and configured to extend at least partly into the retaining sleeve as the bushing assembly is forced into the bushing opening.

5. The press tool system as recited in claim 1, in which the brace assembly comprises a brace rod configured to extend through the drive member, the bushing assembly, the retaining sleeve, and the bushing opening.

6. The press tool system as recited in claim 1, in which the brace assembly comprises an anchor nut configured to engage the structural member such that the brace assembly is arranged and configured to limit movement of the actuator housing assembly relative to the structural member.

7. The press tool system as recited in claim 1, in which the brace assembly comprises a brace nut configured to engage the actuator housing assembly such that the brace assembly is arranged and configured to limit movement of the actuator housing assembly relative to the structural member.

8. The press tool system as recited in claim 1, in which the brace assembly comprises:
a brace rod configured to extend through the drive member, the bushing assembly, the retaining sleeve, and the bushing opening;
an anchor nut configured to engage brace rod and the structural member; and
a brace nut configured to engage brace rod and the actuator housing assembly such that the brace assembly maintains a maximum distance between the actuator housing assembly and the structural member; whereby
the brace assembly is arranged and configured to limit movement of the actuator housing assembly relative to the structural member.

9. A method of pressing a bushing assembly into a bushing opening defined by a structural member, the method comprising the steps of:
providing a tool assembly comprising a brace assembly, a drive member, and a retaining sleeve;
providing an actuator system comprising an actuator housing assembly and a piston member;
arranging the brace assembly to brace the actuator housing assembly relative to the structural member;
arranging the drive member between the piston member and the bushing assembly;
arranging the retaining sleeve at least partly around the bushing assembly; and
operating the actuator system to displace the piston member relative to the actuator housing assembly to force the bushing assembly at least partly through the retaining sleeve and into the bushing opening in a desired position relative to the structural member.

10. The method as recited in claim 9, further comprising the step of arranging and configuring the retaining sleeve to engage the structural member as the bushing assembly is forced into the bushing opening.

11. The method as recited in claim 9, in which the bushing assembly moves relative to the retaining sleeve as the bushing assembly is forced into the bushing opening.

12. The method as recited in claim 9, further comprising the step of arranging and configuring the drive member to extend at least partly into the retaining sleeve as the bushing assembly is forced into the bushing opening.

13. The method as recited in claim 9, in which the step of providing brace assembly comprises the steps of:
providing a brace rod configured to extend through the drive member, the bushing assembly, the retaining sleeve, and the bushing opening; and
arranging the brace rod to extend through the drive member, the bushing assembly, the retaining sleeve, and the bushing opening.

14. The method as recited in claim 9, in which the step of providing the brace assembly comprises the steps of:
providing an anchor nut configured to engage the structural member; and
arranging the anchor nut such that the brace assembly limits movement of the actuator housing assembly relative to the structural member.

15. The method as recited in claim 9, in which the step of providing the brace assembly comprises the steps of:
providing a brace nut configured to engage the actuator housing assembly; and
arranging the brace nut such that the brace assembly limits movement of the actuator housing assembly relative to the structural member.

16. The method as recited in claim 9, in which the step of providing the brace assembly comprises the steps of:
providing a brace rod configured to extend through the drive member, the bushing assembly, the retaining sleeve, and the bushing opening;
providing an anchor nut configured to engage brace rod and the structural member; and
providing a brace nut configured to engage brace rod and the actuator housing assembly such that the brace assembly maintains a maximum distance between the actuator housing assembly and the structural member; whereby
engaging the brace rod with the anchor nut and the brace nut such that the brace assembly limits movement of the actuator housing assembly relative to the structural member.

17. A press tool system for pressing a bushing assembly into a bushing opening defined by a structural member, the press tool system comprising:
a tool assembly comprising a brace assembly, a drive member, and a retaining sleeve; and
an actuator system comprising an actuator housing assembly and a piston member; wherein
the brace assembly is arranged to brace the actuator housing assembly relative to the structural member;
the drive member is arranged between the piston member and the bushing assembly;
the retaining sleeve is arranged at least partly around the bushing assembly;
the retaining sleeve is arranged and configured to engage the structural member as the bushing assembly is forced into the bushing opening; and
the actuator system displaces the piston member relative to the actuator housing assembly to force the bushing assembly at least partly through the retaining sleeve and into the bushing opening in a desired position relative to the structural member.

18. The press tool system as recited in claim 17, in which the drive member is arranged and configured to extend at least partly into the retaining sleeve as the bushing assembly is forced into the bushing opening.

19. The press tool system as recited in claim 17, in which the brace assembly comprises:
- a brace rod configured to extend through the drive member, the bushing assembly, the retaining sleeve, and the bushing opening;
- an anchor nut configured to engage brace rod and the structural member; and
- a brace nut configured to engage brace rod and the actuator housing assembly such that the brace assembly maintains a maximum distance between the actuator housing assembly and the structural member; whereby
- the brace assembly is arranged and configured to limit movement of the actuator housing assembly relative to the structural member.

* * * * *